United States Patent
Cai et al.

(10) Patent No.: US 9,635,747 B2
(45) Date of Patent: Apr. 25, 2017

(54) HID LAMP ACOUSTIC RESONANCE SUPPRESSION METHOD AND BALLAST

(71) Applicant: SHENZHEN TECHONE TECH CO., LTD., Shenzhen, Guangdong (CN)

(72) Inventors: Shixue Cai, Guangdong (CN); Zhongwei Jiang, Guangdong (CN)

(73) Assignee: SHENZHEN TECHONE TECH CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/413,463

(22) PCT Filed: Mar. 12, 2014

(86) PCT No.: PCT/CN2014/073285
§ 371 (c)(1),
(2) Date: Jan. 8, 2015

(87) PCT Pub. No.: WO2015/032193
PCT Pub. Date: Mar. 12, 2015

(65) Prior Publication Data
US 2016/0278190 A1    Sep. 22, 2016

(30) Foreign Application Priority Data
Sep. 3, 2013    (CN) .......................... 2013 1 0393467

(51) Int. Cl.
*H05B 41/36*    (2006.01)
*H05B 41/292*    (2006.01)
*B01J 19/12*    (2006.01)

(52) U.S. Cl.
CPC ............ *H05B 41/36* (2013.01); *B01J 19/123* (2013.01); *H05B 41/2928* (2013.01); *B01J 2219/0801* (2013.01); *B01J 2219/1203* (2013.01); *Y02B 20/208* (2013.01)

(58) Field of Classification Search
CPC ..... H05B 41/36; H05B 41/2928; B01J 19/123
See application file for complete search history.

(56) References Cited

U.S. PATENT DOCUMENTS

2008/0018265 A1*    1/2008    Lee .................... H05B 41/2828
                                                             315/291
2009/0289570 A1*    11/2009   Van Der Voort ...... H05B 41/28
                                                             315/247

* cited by examiner

*Primary Examiner* — Tung X Le
*Assistant Examiner* — Raymond R Chai
(74) *Attorney, Agent, or Firm* — Alston & Bird LLP

(57) ABSTRACT

The invention provides a High Intensity Discharge (HID) lamp acoustic resonance suppression method. Whether acoustic resonance is produced or not is judged, and a frequency-modulated current frequency provided by a ballast when the acoustic resonance is produced to fulfill the aim of suppressing the acoustic resonance. The ballast includes an acoustic resonance elimination module. The invention has the beneficial effects that due to the additional arrangement of the acoustic resonance elimination module, acoustic resonance is maximally suppressed, and the optimal stability of a discharge arc is ensured. These characteristics enable the product to stably run for each type of lamp tube and different power.

2 Claims, 3 Drawing Sheets

HID LAMP ACOUSTIC RESONANCE SUPPRESSION METHOD AND BALLAST

FIELD OF THE INVENTION

The invention relates to the field of ballasts for High Intensity Discharge (HID) lamps, in particular to an HID lamp acoustic resonance suppression method for eliminating the acoustic resonance of an HID lamp and a ballast for specifically implementing the method.

BACKGROUND OF THE INVENTION

When an HID reaches stable arc discharge, a discharge positive column of a coplanar discharge characteristic area is a section of typical high-pressure gas isothermal plasma. In a discharge lamp tube, the concentration of gas atoms is high, there are few free paths of electrons, the electrons highly frequently form elastic collisions with the gas atoms, and the energy of a modulated electric field is easily transmitted to the gas atoms through the electrons, thereby causing gas pressure waves under a frequency the same as that of the external modulated electric field. The pressure waves of discharge gas in the discharge lamp tube may form standing waves, that is, acoustic resonance is produced. A frequency range is very wide, in which a working frequency common for an electronic ballast is included.

When the HID lamp works under a modulated frequency, an acoustic resonance phenomenon arises, which causes influence on the application of a frequency-modulated electronic ballast. The so-called acoustic resonance phenomenon refers to discharge arc instability presented when the HID lamp is driven by a frequency-modulated current. When the HID lamp works within a frequency range of 5-700 KHz, obvious light output fluctuation accompanying with current and voltage fluctuation and arc cambering and shaking will occur in multiple frequency bands. When the frequency is reduced to the lowest instable frequency, an arc may be extinguished, and even an arc tube is exploded.

The acoustic resonance phenomenon manifests as discharge arc instability, cambering and shaking, arc breakage under a serious condition and even arc tube explosion, there are many factors for the occurrence of resonance, such as a shape and size of the discharge tube, the pressure and temperature of the gas in the tube and the service life of the lamp, different batches of lamps produced by different manufacturers have different acoustic resonance frequency ranges, and more importantly, along with the prolonging of service life of the lamps, acoustic resonance points will be changed to a certain extent. Therefore, it is very difficult to solve the problem of acoustic resonance.

A low-power discharge lamp is small in size and high in resonance frequency, a low-frequency square wave driving mode can be used for effectively solving the problem of acoustic resonance. In the ultraviolet curing industry, due to a large curing area and a high energy density requirement, the power of the lamp tube is ranged from several kilowatts to tens of kilowatts. The size of the lamp tube is undoubtedly increased, and the resonance frequency is reduced accordingly. Therefore, the acoustic resonance phenomenon still arises in an actually used working frequency band of the electronic ballast, which causes the problem of reduction in radiation output by ultraviolet rays, and meanwhile, the ballast is damaged by an instable acoustic resonance current.

At present, there are many acoustic resonance detection methods, one of which is to detect a current during the occurrence of acoustic resonance, and a theoretical foundation for such an acoustic resonance detection method is that the current of the lamp changes during the occurrence of acoustic resonance. An experiment shows that, when acoustic resonance occurs during the work of the HID lamp under the modulated frequency, the current of the lamp mainly includes three frequency components: the first is a frequency-modulated current frequency provided by the ballast; the second is a ripple frequency; and the third is a current generated by acoustic resonance. A detection circuit filters the former two currents with the acoustic resonance current left, and amplifies the acoustic resonance current to judge whether the HID lamp is in an acoustic resonance state or not. Like the other detection methods, the method is very complex and low in practicability.

SUMMARY OF THE INVENTION

A purpose of the invention is, for the abovementioned shortcoming, to provide an HID lamp acoustic resonance suppression method and a ballast.

The technical scheme of the invention is that: an HID lamp acoustic resonance suppression method is provided, wherein whether acoustic resonance is produced or not is judged, and a frequency-modulated current frequency provided by a ballast when the acoustic resonance is produced to fulfill the aim of suppressing the acoustic resonance, the method including the following steps:

A: performing in-phase detection on a current of a lamp tube, wherein an outgoing current and an incoming current of output lines of the ballast are simultaneously detected;

B: judging whether the outgoing current and the incoming current, which are simultaneously detected, of the output lines of the ballast are inphase and equal or not, and if the outgoing current and the incoming current are inphase and equal, locking a current frequency-modulated current frequency provided by the ballast and ending the method, otherwise turning to Step C; and C: linearly changing the frequency-modulated current frequency provided by the ballast within a low-frequency range, and turning to Step A.

Furthermore, in the HID lamp acoustic resonance suppression method: Step B includes the following steps:

B01: performing inphase subtraction on the outgoing current and the incoming current to generate a difference;

B02: amplifying the difference;

B03: shaping the amplified difference, wherein the amplified difference is subjected to magnitude judgment to generate a high/low-level logic pulse signal; and B04: detecting a pulse width of the pulse signal, and when the pulse width exceeds a set threshold value, determining that the outgoing current and the incoming current is inphase and unequal.

The invention also provides a ballast for implementing the HID lamp acoustic resonance suppression method, including an acoustic resonance elimination module, wherein the acoustic resonance elimination module includes a signal detection module and an output frequency control module;

the signal detection module includes a lamp current inphase detection module for detecting an outgoing current and an incoming current of output lines of the ballast, a signal amplification module for amplifying a signal of the lamp current inphase detection module and a wave shaping module for performing high/low-level binarization on the output of the signal amplification module to form a pulse width signal; and the output frequency control module includes a clock generation module, a level identification module for judging the pulse width signal output by the wave shaping module to judge whether acoustic resonance is produced or not and a voltage-controlled frequency generation module for linearly changing an output frequency within a low-frequency range based on a signal of the clock generation module according to the signal identified by the level identification module.

Furthermore, in the ballast for implementing the HID lamp acoustic resonance suppression method: the lamp current inphase detection module includes a current transducer module, wherein a primary side and a secondary side of the current transducer module penetrate through the two output lines of the ballast respectively; and an output end of the current transducer module outputs a voltage signal representative of a difference between the outgoing current and the incoming current of the output lines of the ballast through a current/voltage conversion circuit.

Furthermore, in the ballast for implementing the HID lamp acoustic resonance suppression method: the current/voltage conversion circuit includes resistors R4 and R5 and a capacitor C9, wherein the resistors R4 and R5 and the capacitor C9 are connected in parallel to form a parallel circuit; and one end of the parallel circuit is grounded, and the other end of the parallel circuit is connected with the output end of the current transducer module.

Furthermore, in the ballast for implementing the HID lamp acoustic resonance suppression method: the signal amplification module includes an operational amplifier IC4, wherein an input signal of the operational amplifier IC4 is the voltage signal which is output by the lamp current inphase detection module and represents the difference between the outgoing current and the incoming current of the output lines of the ballast, and is input from second and third pins and output from a sixth pin.

Furthermore, in the ballast for implementing the HID lamp acoustic resonance suppression method: a protective circuit is also arranged at second and third pin input ends of the operational amplifier IC4, and includes diodes D3 and D4 which are reversely connected, wherein an anode of the diode D3 and a cathode of the diode D4 are connected between the input signal and the third pin of the operational amplifier IC4; and a cathode of the diode D3 and an anode of the diode D4 are connected between the ground and the second pin of the operational amplifier IC4.

Furthermore, in the ballast for implementing the HID lamp acoustic resonance suppression method: current limiting resistors R9 and R8 are also arranged between the protective circuit and the input signal of the operational amplifier IC4 and between the protective circuit and the ground respectively, and a filter circuit is also arranged at an amplification output end of the operational amplifier IC4, and includes a filter resistor R3 and a filter capacitor C7, wherein the amplification output end of the operational amplifier IC4 is grounded in series through the filter resistor R3 and the filter capacitor C7.

Furthermore, in the ballast for implementing the HID lamp acoustic resonance suppression method: the wave shaping module includes a Schmidt trigger IC3, and a signal amplitude limiting circuit is also arranged before a shaped signal is input into the Schmidt trigger IC3.

After the adoption of the technical scheme, the acoustic resonance elimination module is additionally arranged in the electronic ballast, and different working frequencies can be looked for to avoid an acoustic resonance frequency band related to own parameters of the lamp tube. Therefore, the technical problem of arc instability caused by acoustic resonance under the condition that an ultraviolet curing lamp tube works within the low-frequency range is solved.

The invention has the beneficial effects that due to the additional arrangement of the acoustic resonance elimination module, acoustic resonance is maximally suppressed, and the optimal stability of a discharge arc is ensured. These characteristics enable the product to stably run for each type of lamp tube and different power.

The invention is described below with reference to the drawings and embodiments in detail.

DETAILED DESCRIPTION OF THE PREFERRED EMBODIMENTS

Figure 1:
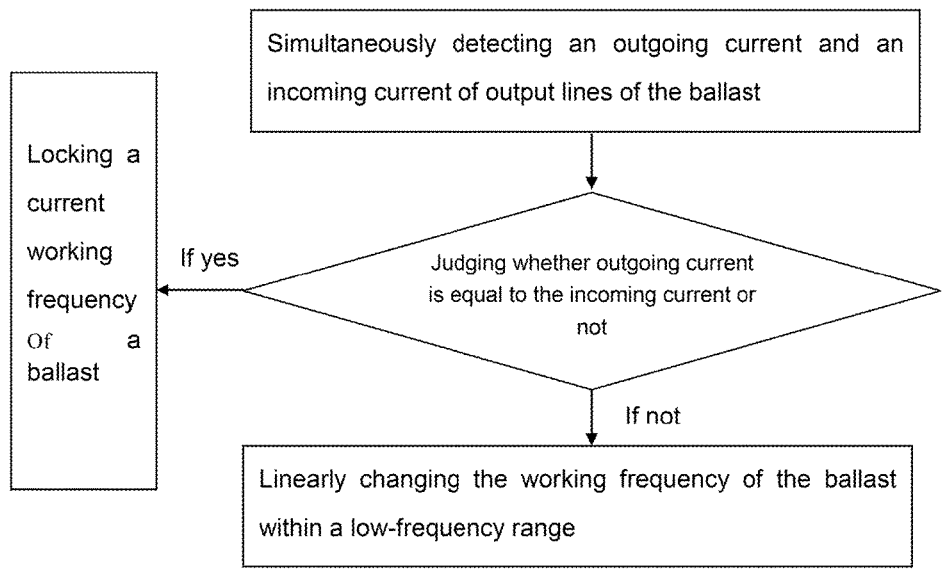
FIG. 1 is a flowchart of a method according to embodiment 1 of the invention.
Figure 2:
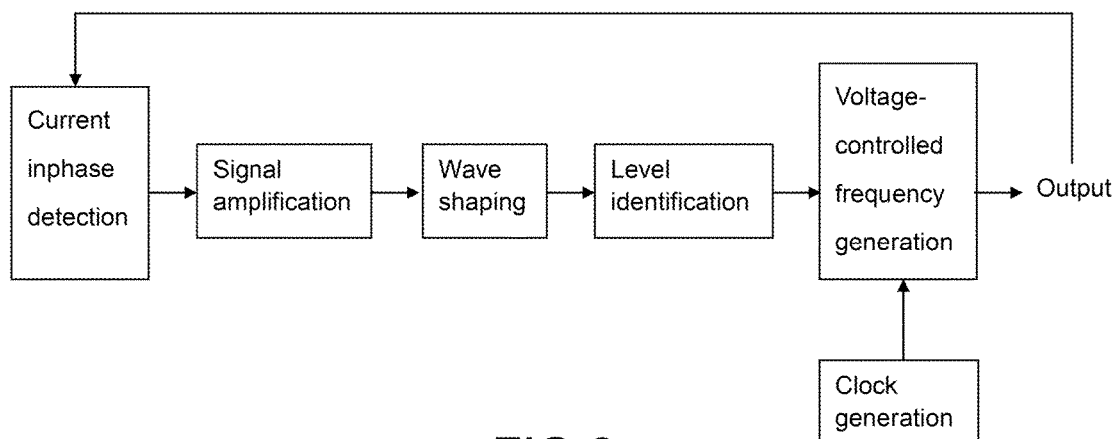
FIG. 2 is a structure diagram of a ballast according to embodiment 1 of the invention.

As shown in FIG. 2, embodiment 1 provides an ultraviolet curing electronic ballast with an acoustic resonance elimination function, which is provided with an acoustic resonance elimination module, wherein the acoustic resonance elimination module includes a signal detection module and an output frequency control module. The signal detection module includes a lamp tube current inphase detection module, a signal amplification module and a wave shaping module. The lamp tube current inphase detection module detects outgoing and incoming currents of two output lines of the electronic ballast by utilizing the theory of a current transducer that electric sensing directions are canceled with each other if phases of the currents are opposite and amplitudes of the currents are the same, detects real-time current waveforms within the whole working time, and determines that the incoming current and the outgoing current are unequal during the occurrence of acoustic resonance.

Figure 3:
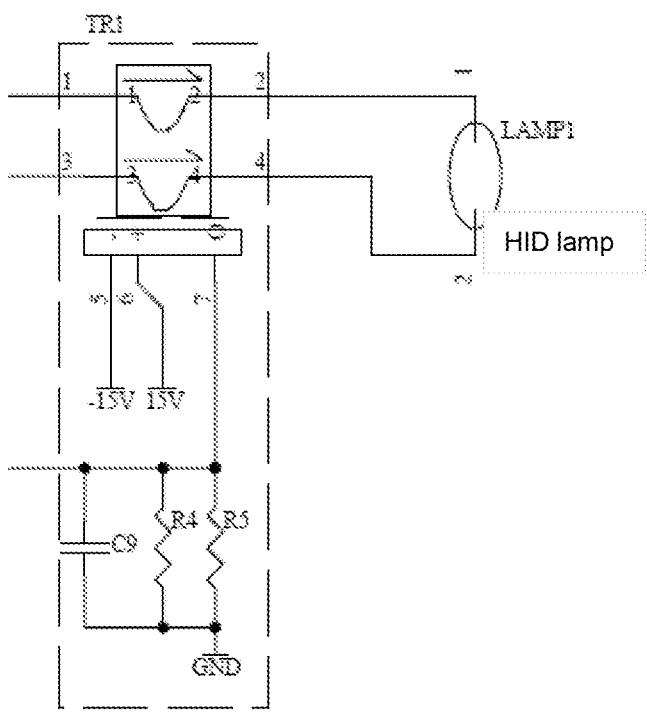
FIG. 3 is a schematic diagram of a lamp current inphase detection module used in embodiment 1 of the invention.

The detection module outputs a current difference signal, as shown in FIG. 3.

In FIG. 3, two groups of pins formed by first and third pins and second and fourth pins of the current transducer T respectively are connected between the ballast and an HID lamp respectively, and the output of X4 and X5 is connected with the HID lamp, as shown in FIG. 3. In the embodiment, a model number of the current transducer module TR1 is LA 55-P. An output end of the current transducer module TR1 is a seventh pin, fifth and sixth pins are connected to a power supply, and a 15V power supply is adopted in the embodiment. R4, R5 and C9 connected in parallel with the output end of the current transducer module TR1 convert a current detected by the current transducer into a voltage signal Vx. As shown in FIG. 3, the current of the HID lamp in the embodiment flows into the first and third pins of the current transducer module, and flows out of the second and fourth pins to reach the HID lamp; and because the first and third pins are inphase, the current flows into the first pin, flows out of the second pin, and sequentially returns to the fourth and third pins through the HID lamp. When the HID lamp normally works, the incoming current and the outgoing current are equal, and 0 current is output by the current transducer; and during the acoustic resonance of the HID lamp, the current of the first and second pins is unequal to that of the third and fourth pins, the currents of the two lines are not canceled completely, and a difference signal current, which is not canceled, of the current of the two output lines is output by the current transducer, and forms voltage drop output on R4, R5 and C9, the amplitude of an output voltage being U=I*R.

Figure 4:
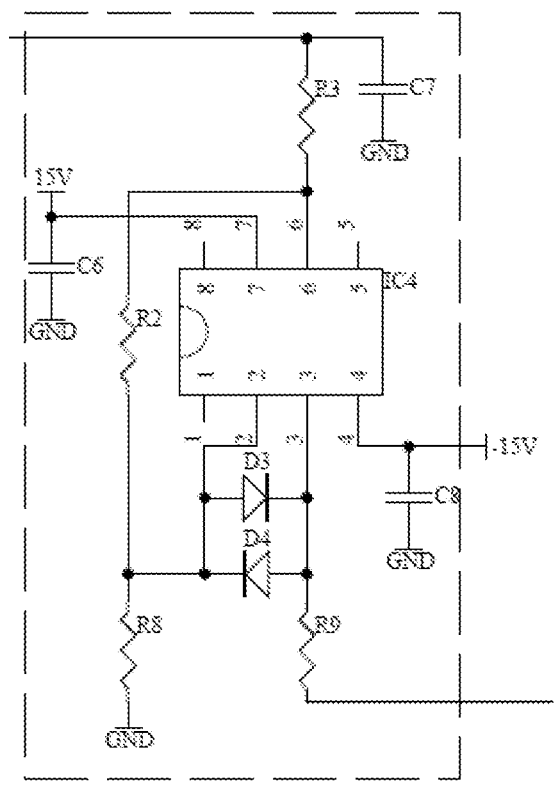
FIG. 4 is a schematic diagram of a signal amplification module used in embodiment 1 of the invention.

The signal amplification module, as shown in FIG. 4, amplifies a small difference signal to logic signal amplitude required by the wave shaping module. In the embodiment, an operational amplifier IC4 with a model number of 0P07 is adopted for amplifying the small difference signal of the current detection module, the current difference signal Vx output by the detection module is input from the second and third pins, Vxx is output from the sixth pin after the current difference signal Vx is amplified, and an interference signal is filtered by R3 and C7. Two diodes D3 and D4 function in preventing an excessively high input voltage and protecting IC4 from being damaged.

Figure 5:
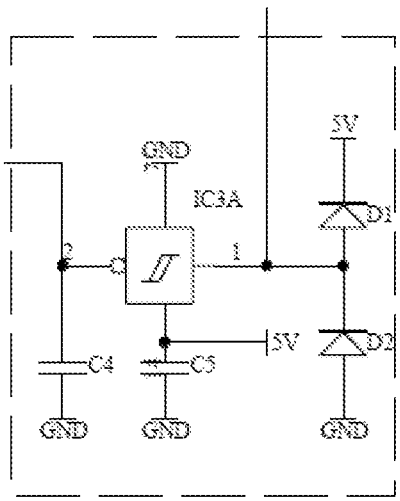
FIG. 5 is a schematic diagram of a wave shaping module used in embodiment 1 of the invention.

As shown in FIG. 5, the wave shaping module consists of a Schmidt trigger, wherein the Schmidt trigger has a requirement on a level threshold value which is specified to be 1.4-2.1V for distinguishing a high level from a low level. Moreover, the Schmidt trigger can convert a periodic signal with a slowly changing edge into a rectangular signal Vxxx with a steep edge to facilitate the accurate signal identification of a later circuit. When the amplitude of the signal Vxx output by the signal amplification module is higher than 2.1V, the wave shaping module outputs a high-level signal. When the amplitude of the signal Vxx is lower than 1.4V, the wave shaping module outputs a low-level signal. A control system includes a clock generation module, a level identification module and a voltage-controlled frequency generation module. The level identification module judges whether an acoustic resonance condition occurs or not according to a width of a logic level, and simultaneously filters a false interference narrow-pulse signal.

As shown in FIG. 5, diodes D1 and D2 are used for limiting the amplitude of the signal Vxx input by the signal amplification module. A model number of the Schmidt trigger IC3 is 74HC14. Capacitors C4 and C5 are decoupling capacitors for eliminating the interference signal.

Figure 6:
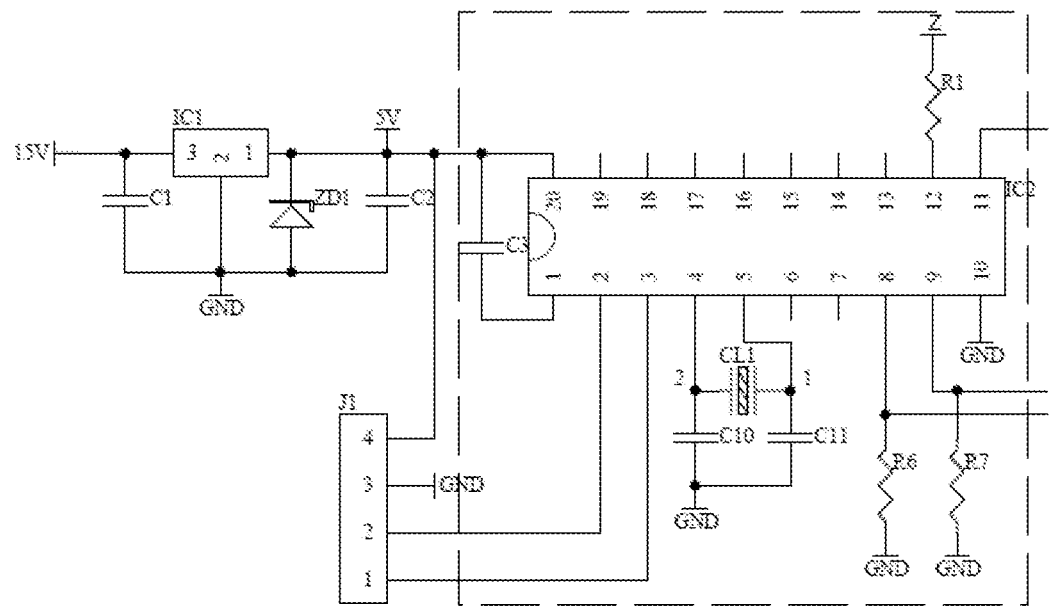
FIG. 6 is a schematic diagram of a master control module used in embodiment 1 of the invention.

As shown in FIG. 6, the level identification module detects the time width of the logic level output by the wave shaping module in real time, and determines that a bulb resonates when the time width of high-level output is more than 10 ms. The clock generation module is used for generating a reference clock frequency which is an output frequency for starting work. The voltage-controlled frequency generation module linearly changes the output frequency within a low-frequency range based on a signal of the clock generation module according to the signal Vxxx identified by the level identification module. The clock generation module generates a 4 MHz clock through a 4 MHz crystal oscillator, and counts the 4 MHz clock through a counter, once for 0.25 microsecond, a 250 Hz signal is generated by 8,000 times of counting, and an output level is inverted for 8,000 times of counting after 2 ms, and is inverted again to generate a 250 Hz alternating current signal. When the level identification module detects acoustic resonance, the voltage-controlled frequency generation module changes the counting times into 8,001 times, and the output frequency changes into 249.968 Hz; and if the level identification module still detects acoustic resonance after the frequency changes, the voltage-controlled frequency generation module changes the counting times into 8,002 times, and the output frequency changes into 249.937 Hz, and so on, the output frequency is linearly reduced. When acoustic resonance is stopped, a current working frequency is locked for running. During practical application, the clock generation module outputs 250 Hz, and the low-frequency range is 250-50 Hz. A time-base signal of the voltage-controlled frequency generation module is changed, and a linear changing rate of the frequency is smaller than 0.05 Hz, so that stable frequency transition is realized.

This part finishes judgment and production of a control signal. In the embodiment, a processor is used for finishing control by virtue of programs. In a circuit diagram, there is a single-chip microcomputer IC2, a model number of which is 12C2052AD. A stabilized power supply of the single-chip microcomputer IC2 is a 5V stabilized power supply consisting of IC1, C1, ZD1 and C2, and the model number of the single-chip microcomputer is HT7550-1. A clock circuit of the single-chip microcomputer is a 4 MHz frequency generation circuit consisting of CL1, C10, C11 and an internal circuit of the single-chip microcomputer IC2, and generates the 4 MHz clock. A pulse signal shaped by the Schmidt trigger IC3 is input from an eleventh pin of the single-chip microcomputer IC2, and is identified by the level identification module and the voltage-controlled frequency generation module, which consist of the programs, and the regulated 250 Hz alternating current signal is output from eighth and ninth pins.

In the embodiment, whether acoustic resonance is produced or not is judged in a control process, and a frequency-modulated current frequency provided by a ballast is changed when acoustic resonance is produced to fulfill the aim of suppressing acoustic resonance, the control process including the following steps:

A: performing in-phase detection on a current of a lamp tube, wherein an outgoing current and an incoming current of output lines of the ballast are simultaneously detected;

B: judging whether the outgoing current and the incoming current, which are simultaneously detected, of the output lines of the ballast are inphase and equal or not, and if the outgoing current and the incoming current are inphase and equal, locking a current frequency-modulated current frequency provided by the ballast and ending the control process, otherwise turning to Step C, wherein Step B includes:

B01: performing inphase subtraction on the outgoing current and the incoming current to generate a difference;

B02: amplifying the difference;

B03: shaping the amplified difference, wherein the amplified difference is subjected to magnitude judgment to generate a high/low-level logic pulse signal; and B04: detecting a pulse width of the pulse signal, and when the pulse width exceeds a set threshold value, determining that the outgoing current and the incoming current is inphase and unequal; and C: linearly changing the frequency-modulated current frequency provided by the ballast within a low-frequency range, and turning to Step A.

What is claimed is:

1. A High Intensity Discharge (HID) lamp acoustic resonance suppression method, wherein whether acoustic resonance is produced or not is judged, and a frequency-modulated current frequency provided by a ballast when the acoustic resonance is produced to fulfill the aim of suppressing the acoustic resonance, the method comprising the following steps:

A: performing in-phase detection on a current of a lamp tube, wherein an outgoing current and an incoming current of output lines of the ballast are simultaneously detected;

B: judging whether the outgoing current and the incoming current, which are simultaneously detected, of the output lines of the ballast are inphase and equal or not, and if the outgoing current and the incoming current are inphase and equal, locking a current frequency-modulated current frequency provided by the ballast and ending the method, otherwise turning to Step C; and C: linearly changing the frequency-modulated current frequency provided by the ballast within a low-frequency range, and turning to Step A.

2. The HID lamp acoustic resonance suppression method according to claim 1, wherein Step B comprises the following steps:

B01: performing inphase subtraction on the outgoing current and the incoming current to generate a difference;

B02: amplifying the difference;

B03: shaping the amplified difference, wherein the amplified difference is subjected to magnitude judgment to generate a high/low-level logic pulse signal; and B04: detecting a pulse width of the pulse signal, and when the pulse width exceeds a set threshold value, determining that the outgoing current and the incoming current is inphase and unequal.

* * * * *